UNITED STATES PATENT OFFICE.

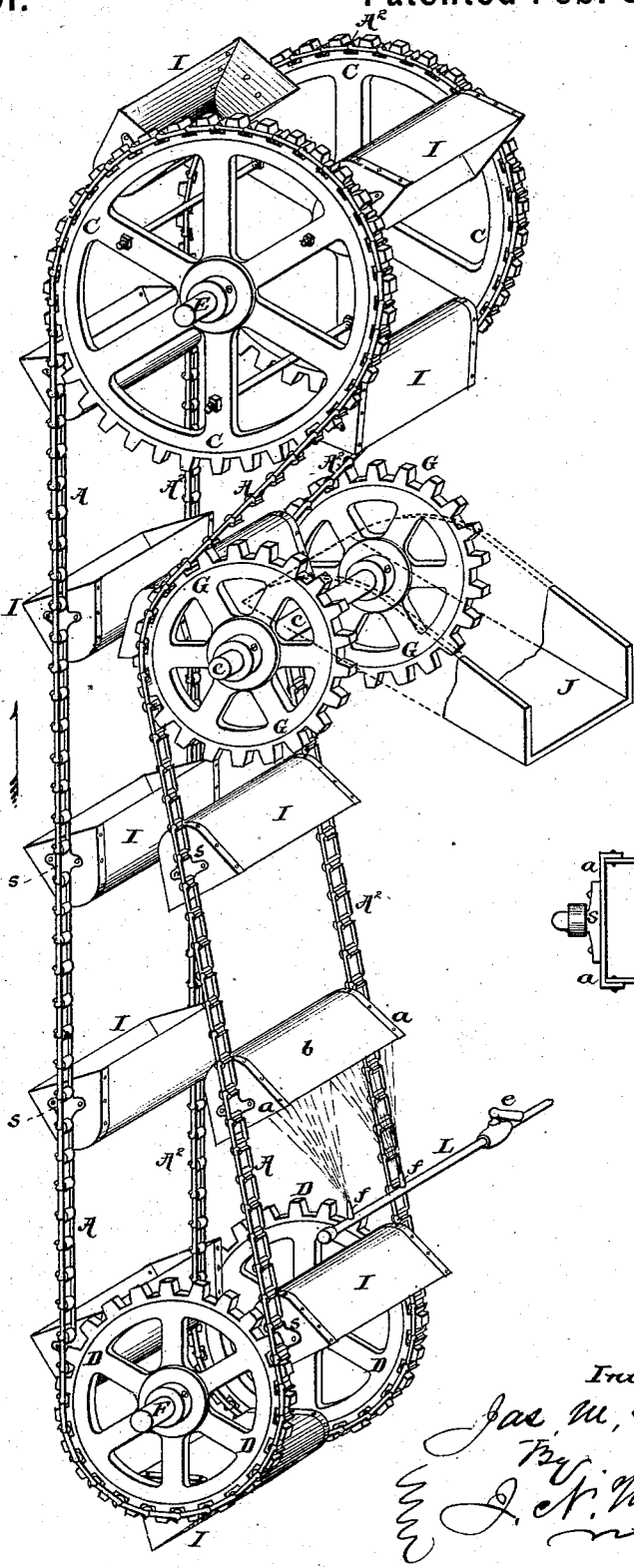

JAMES M. DODGE, OF CHICAGO, ILLINOIS, ASSIGNOR TO EWART MANUFACTURING COMPANY, OF SAME PLACE.

ELEVATOR.

SPECIFICATION forming part of Letters Patent No. 237,501, dated February 8, 1881.

Application filed December 14, 1880. (No model.)

*To all whom it may concern:*

Be it known that I, JAMES MAPES DODGE, of Chicago, in the county of Cook and State of Illinois, have invented certain new and useful Improvements in Elevators; and I do hereby declare that the following is a full and exact description thereof, reference being had to the accompanying drawings, making part of this specification.

My invention relates to certain new and useful improvements in that kind of elevators which are composed of a series of buckets mounted on an endless belt or chain, and adapted to pick up, elevate to a given locality, and there automatically discharge the material thus handled or manipulated.

Previous to my invention this kind of elevator-contrivance has been made with each bucket secured at one of its sides to the belt or chain, and so that said bucket projected wholly beyond the belt or chain, in a manner familiar to those skilled in the art. In a machine or contrivance constructed upon this principle the means or devices by which the bucket is secured to the belt or chain (as well as the bucket and chain or belt at the locality of their attachment together) are subjected to a strain, in lifting the material being elevated, very much in excess of that which would be due merely to the gravity of the load lifted, because the relation of the bucket to its supporting devices is such that the weight of the bucket's contents exerts a severe leverage on the parts of the machine at the point of attachment of the bucket to the belt or chain; and in striking into and scooping up the material to be elevated the bucket-fastenings and other parts are subjected to a still severer strain, by reason of the side attachment of the bucket to the belt or chain, since in this operation the bulk of the shock is imparted to the outer edge and portion of the bucket, and hence occurs at a point where the greatest degree of leverage over the bucket and belt attachment devices is exercised.

I propose to remedy this defect in the principle of construction of elevators, and provide for use a contrivance in which the attachment devices of the bucket and belt or chain shall be subject to a lifting-strain commensurate only with the actual weight of the load to be raised, and in which the shock to which the parts of the machine are subjected in filling the bucket shall be very much diminished.

To this end and object my invention consists in having the buckets of an elevator suspended from or connected to the belt or chain in such a manner that the entire weight of the bucket and its contents will, during the lifting operation, be balanced upon the points of securement of the bucket to the chain or belt, and hence so that the load will not exert any leverage on either of the attachment devices or the belt or chain at the points of attachment to it, all as will be hereinafter more fully explained.

In the construction of elevators previous to my invention it has also been customary to make the contrivance so that the belt or chain carrying the buckets had necessarily, in descending, to run in a straight line extending from the periphery of the upper to that of the lower pulley or chain-wheel, and therefore the buckets have had to be run at a certain degree of speed in order to accomplish the emptying of the buckets at the proper time and place in their path of motion.

It has been necessary to vary the running speed of the elevator according to the character of the material being operated upon and adapt the speed to the nature of the material, as otherwise the latter would in many cases fall down the descending leg of the elevator, the speed of the bucket not having been right to throw its contents out and into the chute or dump, and a most serious objection to this necessary mode of operation has been that generally that sort of material which has required a high rate of speed in the buckets, in order to effect a proper discharge at the upper end of the elevator, has been that which, to prevent great undue strain, should be picked up or scooped by the bucket at a very low rate of speed; in other words, that material in the handling of which the buckets should move slowest, in order to prevent unnecessary strain and shock on the parts of the machine in scooping or picking up the load, is usually the kind of stuff to discharge or empty the buckets of, which the machine must run at a high rate of speed.

I propose to provide an elevator in the use of which it will not be necessary to run at a given speed in order to accomplish the emptying of the buckets at the proper time and place, and in which there shall be no necessity for various speeds, according to the different materials to be manipulated, and hence in which the most appropriate speed may be employed for the scooping or picking up of the load without danger of any failure to properly discharge the buckets of their contents; and to this end and object my invention further consists in having the elevator made with the bucket-carrying belt or chains run under in descending from the upper pulleys or wheels, so that the buckets, after passing over the upper turn, shall be turned upside down immediately over, and shall dump their contents into, a chute properly placed before the buckets enter the descending leg of the elevator, all as will be hereinafter more fully explained.

In the use of elevators heretofore made serious difficulty has sometimes arisen in handling certain materials which are likely to stick to the interior surface of the bucket, and hence liable not to be properly discharged therefrom automatically. I propose to overcome this defect or difficulty by having the interior surface of the bucket wetted just before it takes its load, and thus facilitate the ready dumping of the contents of the bucket; and to this end and object my invention still further consists in the employment, in connection with the buckets of an elevator, of means for supplying a jet or jets of water, adapted to thoroughly wet the interior surfaces of the bucket just previous to its taking its load, all as will be hereinafter more fully explained.

Previous to my invention it has been customary to make the buckets for elevators of various patterns and of different materials, but always, so far as my knowledge goes, of material and a construction such that some portions of the bucket have been unnecessarily heavy, in order to get the necessary strength and durability at the portions requiring them. I propose to remedy this defect in the construction of the buckets; and to this end and object my invention consists, finally, in a bucket composed of two heads or end pieces of cast metal, (having each a supporting-flange,) and a body portion composed of sheet metal bent into the proper form and riveted or otherwise secured at its ends to the flanges of the bucket-heads, all as will be presently more fully described.

To enable those skilled in the art to make and use my invention, I will now proceed to more fully explain it, referring by letters to the accompanying drawings, forming part of this specification, and in which—

Figure 1 is a perspective view of so much of an elevator apparatus as it is necessary to show in order to illustrate the several features of my invention, and Fig. 2 is a detail view (increased scale) showing more plainly the novel construction of bucket forming one of the features of my invention.

In the several figures the same part is designated by the same letter of reference.

At Fig. 1, I have shown the contrivance as rather too short in proportion to the dimensions of the elevator, for the convenience of illustrating the whole apparatus in working order within the size to which the drawings must be restricted, and without making the smaller parts too fine in the drawings.

A $A^2$ are two endless carriers, which I have shown in the form of drive-chains or chain-belts, each mounted to run on the peripheries of and engage with the sprockets of two wheels, C and D, the first-named of said wheels being at the top and the last-mentioned at the bottom or foot of the elevator, and the two upper wheels, C C, and the two lower ones, D D, being mounted, respectively, on the upper and lower shafts E and F. These shafts are supposed to be mounted in suitable bearings in the usual manner, and the lower one is supposed to be driven by the usual motive means and power and the desired speed.

The upper wheels, C C, it will be observed, are of a considerably greater diameter than the lower ones, D D, and slightly below and to one side of the wheels C C are located two other and smaller sprocket-wheels, G G, each of which has its teeth or sprockets to engage with one of the drive-chains A and $A^2$, but at the opposite side or face of the chain to that in contact with which the peripheries of the other sprocket-wheels, C and D, come, all as clearly shown.

I are the buckets, each of which is of a novel structure, (to be presently explained,) composed of two heads, $a\ a$, and a body portion or piece, $b$, and is attached at one end, (or by one of its heads, $a$,) to one of the chains A, and at the other to the other of said chains, $A^2$.

Immediately over the shaft $c$ of the wheels G G, and with its inner end located about as near to the drive-chains as may be without interfering with the buckets I, is arranged the chute or dump J, into which the elevated material is to be discharged or dumped from the buckets. I have shown part of this chute J in dotted lines, to prevent a confusion of parts in the drawings. This chute device J may be of any desired size and pattern, and held in place in any proper manner, its function being merely the usual one of a receiver to receive the contents of the buckets as they turn upside down and dump or empty themselves of the contained material.

L is a water-supply pipe, which may have a cock at $e$ to control the supply to and cutting off from the jet-nozzle $ff$ of the water. There may be any desired number of jet-nozzles $f$, of any suitable kind adapted to throw the proper quantity of water, in the condition of spray, into the interior of the buckets, and as it is deemed expedient to have the buckets wetted inside just before they arrive at the point where they have to scoop or gather the material to be lifted by them, I have, by preference, placed the said water-pipe and nozzles near the lower end of the elevator chain-belts, as shown.

The novel structure of the bucket will be best seen at Fig. 2, where it will be observed that each head $a$ is composed of a cast-metal piece, preferably of malleable iron, having a right-angled flange at its perimeter, to which is riveted or otherwise secured one end of the bent sheet-metal piece which composes the body of the bucket. The shape of the body may be that shown or some other, and each head $a$ of the bucket is attached to one of the chains A A² by means of a carrier attachment, $s$, of the chain, (which, preferably, is cast integral with one of the side bars of one of the chain-links, as shown,) which is bolted or riveted to said bucket-head.

The locality of the attachment $s$ relatively to the bucket, or the relative arrangement of these attachment devices with the bucket-heads, is such, as shown, that when the buckets are right side up to carry—as, for instance, those at the right-hand side of Fig. 1—the bucket, with its contained load, will have its center of gravity in a vertical plane which about coincides with the edges of the chains A A², and, by preference, at a level slightly below the level of the rivets by which the device is fastened to the bucket-head $a$, and the bucket will be hung about centrally between the adjacent edges of the two chain-belts.

By this mode of construction both the chain and the attachment device will be entirely relieved of all the leverage or twisting strain that occurs in that kind of machines (heretofore used) in which the bucket is attached to the chains or belt at one side of the bucket.

In scooping up or taking its load automatically the carrier devices and attachments are subjected to far less strain and shock than when the bucket is held by the side opposite to that which must first enter and gather up the material to be scooped and lifted.

This feature of my invention—i. e., the construction of the machine with the buckets held by the elevator chains or belts at the middle of each end, or so as to have the supporting devices substantially in line, in lifting, with the center of gravity of the load, is a most important one, and may, of course, be carried out under various modifications of the details of construction.

By throwing the chains, and hence the line of buckets, underward of the upper wheels, C C, as shown, by means of the idlers or tighteners G G, so that in turning over and beginning their descent the buckets are completely overturned before they get away from the peripheries of wheels C, and so that the chute or dump J can be placed with its inner end clear up under the completely-inverted bucket, I am enabled, it will be understood, to run the elevator at a comparatively low rate of speed, and at the same time have the buckets discharge with certainty their entire contents into the chute J and avoid any falling back (through the descending leg of the elevator) of any of the once elevated material. Furthermore, by being enabled thus to perfectly discharge the buckets of their contents at a very low rate of travel, I can regulate the speed of the elevator irrespectively of the discharging operation and adjust it to suit the requirements of the scooping-up or gathering operation of the buckets. This is a great desideratum, because, according to the nature of the material to be scooped up, the moving buckets should be made to travel with more or less speed, in order to do the gathering with the least strain on and shock to the parts, and with the most economical and judicious expenditure of the motive power employed to do the work, and this feature or part of my invention, it will be understood, may be carried out in various forms as to the details, and, like the first part of my invention, may, with great advantage, be embodied in a machine not embracing the rest of my improvements. For instance, in a machine having the buckets hung at one side and on a broad belt, (of any sort,) the bucket-carrying belt might be run under, in the manner described, to produce the desirable result of the second part or feature of my invention by having the belt considerably broader than the length of a bucket and idlers or tighteners arranged to work against the projecting edge portions of the belt; or this end may be accomplished by other means.

Only in handling certain materials which are liable to stick to the interior of the bucket, and therefore not be properly discharged, is the water-throwing device very useful, though it might be employed, conveniently, solely for the purpose of washing out the buckets when they may have become soiled or are in an undesirable condition for handling certain stuff.

Whenever the thorough wetting of the interior of the bucket facilitates either the gathering or discharging operations, or both, water may be let in by turning the cock $e$, when the bucket will be subjected to the action of sprays, as indicated by the broken lines at Fig. 1, thrown from the nozzles. This feature of my improved elevator may, of course, be applied with equal advantage to machines which may in all other particulars be different from that herein described and shown.

It will be seen that by making the bucket or scooping-up or gathering and carrying device I of a sheet of metal, $b$, bent into the proper shape, and two metal heads or end pieces, $a\ a$, provided with flanges to embrace the ends of the bent sheet $b$, and riveted to $b$, as shown and described, an exceedingly strong, light, and durable bucket is produced at a comparatively small cost, and this feature of my invention may be with more or less advantage applied in any case in which buckets similar to those of an elevator are employed for analogous purposes.

The general operation of the elevator—that is, the driving mechanism, the functions of the spouts, casings, &c.—are all about the same as usual, and no particular reference to them here is needed by those skilled in the art, to whom this specification is addressed.

It will be seen with my improved elevator, while the main advantages alluded to as consequential to my invention are gained, other and collateral ones are attained—as, for instance, the capacity, under any and all circumstances, to work perfectly in and be constructed and arranged within the smallest possible space, &c.; but I need not here dwell upon such and other minor advantages.

Having so fully explained my invention, what I claim as new, and desire to secure by Letters Patent, is—

1. In an elevator having carrying receptacles or buckets rigidly attached to the chains or belts, the combination of said buckets with the chains or belts, in such manner, as described, that the buckets are supported with their centers of gravity or resistance substantially in line with the points of securement of the buckets to the chains, for the purpose set forth.

2. In an elevator having the buckets rigidly secured to the carrier chains or belts, and protruding outwardly beyond the planes of travel of the exterior surface of the belt or chains, the combination, with the chains and their buckets, of means, substantially such as described, for turning underward the buckets as they begin their descent, all substantially in the manner set forth.

3. In combination with the descending column of buckets, suitable means for throwing a spray or sprays into said buckets while upside down, and just before assuming their load-acquiring position, as set forth.

In witness whereof I have hereunto set my hand this 10th day of December, 1880.

JAMES M. DODGE.

In presence of—
 BURROUS M. SAUNDERS,
 HENRY WIGHT.